UNITED STATES PATENT OFFICE.

JOHN JOSEPH ARTHUR DE WHALLEY, OF LEE, ENGLAND, ASSIGNOR TO THE MOLASSINE COMPANY LIMITED, OF EAST GREENWICH, ENGLAND.

PROCESS OF MAKING FERTILIZER FROM PEAT.

1,221,979.  Specification of Letters Patent.  Patented Apr. 10, 1917.

No Drawing.  Application filed March 2, 1916.  Serial No. 81,687.

*To all whom it may concern:*

Be it known that I, JOHN JOSEPH ARTHUR DE WHALLEY, a subject of the King of Great Britain, and resident of Park House, Brandram Road, Lee, in the county of Kent, England, have invented new and useful Improvements in Process of Making Fertilizer from Peat, of which the following is a specification.

This invention relates to improvements in the treatment of peat and the production of a preparation suitable for use in horticulture and agriculture, the object of the invention being to produce a fertilizer or manure which will improve the soil chemically, physically and bacteriologically and the beneficial action of which will be lasting or sustained.

For many years attention has been devoted to the treatment of peat for the purpose of rendering it suitable as a manure and there have been many proposals to saturate the peat with ammoniacal liquors, or with ammonia absorbed from gas, but the desired effects have not been obtained because an excess of alkali is harmful to the useful bacteria in the soil and also to germinating seeds and other vegetation in the soil. Proposals have been made, also, to saturate the peat with ammonia and to fix the ammonia in the peat by means of sulfuric acid whereby ammonia sulfate was formed in the peat, but in such cases the function of the peat simply becomes that of a vehicle for the ammonia sulfate, and moreover the addition of mineral acids is not desirable. Other proposals have included the production of humate of ammonia by treating peat with hot ammoniacal solution, the production of nitrifying bacteria by spraying heaps or beds of peat with ammoniacal solution containing the bacteria, and the subjection of peat or prepared peat to the action of a culture of micro-organisms, capable of producing ammonia; the present invention however aims at securing improved results by more simple and effective treatments than those above referred to.

Now according to this invention black or dark peat is treated with a relatively limited quantity of ammonia which is at least sufficient for neutralizing the free acids, chief among which is humic acid, in the peat or for making the mass slightly alkaline. To the peat mass treated in this way a suitable percentage, usually between 5% and 20%, of calcium carbonate is added and mixed so as to be more or less uniformly distributed throughout the mass. The preparation is then ready for application to the soil or ground to be fertilized or enriched.

It may be explained that in the state to which the peat is brought by the aforesaid treatment with ammonia, it is favorable to the taking place of certain changes or actions which are beneficial to the soil and the growth of vegetation therein. These changes or actions however are liable to restore to a greater or lesser extent the original acidity of the peat but the presence of the calcium carbonate avoids this.

In some cases it is advantageous to have the ammonia act in a gaseous state upon the peat and for this purpose the pre-determined quantity of ammonia sulfate or any other suitable ammonium salt is added to and mixed with the peat and the necessary quantity of alkaline earth or more advantageously alkali or alkaline carbonate is also added which will react with the ammonia sulfate and liberate ammonia in the peat. In this way ammonia is caused to act intimately and uniformly throughout the mass and in easily regulatable quantities, so that it is possible to realize to a nicety the neutralization of the free acids in the peat and the rendering of the latter slightly alkaline. Calcium carbonate is added to the mass so treated, as above described.

As a practical example of a process by means of which a very effective product is obtained the following may be given:—

One ton of black or dark peat is dried or dehydrated in the atmosphere, or in a suitable machine until sufficient moisture has been removed for enabling the peat to be suitably ground. For instance it may be ground or reduced to a more or less fine powder and in some cases may be sieved. The amount of moisture which may conveniently be left in the peat, varies with different kinds of peat but 35% by weight of moisture has been found a convenient proportion to leave in the mass. Two hundredweight of ammonia sulfate in the form of crystals, or in aqueous solution is well mixed with the peat by means of spades or implements or suitable mixing machines.

Two hundredweight of potassium carbonate, preferably in a finely powdered form, is next added and further mixing is performed in order to obtain uniform distribution throughout the mass. The production and recombination of ammonia now takes place and finally from one to four hundredweight of calcium carbonate is added preferably in a finely powdered form, and is intimately mixed with the mass, the latter being then ready for being put up in bags or otherwise made ready for delivery to the place of use.

The various quantities given by way of example may, however, vary according to the purity and strength of the reagents or ingredients employed.

For producing any desired or specified effects in the soil, small quantities of mineral bodies may be added to the peat product, as for example further compounds of potash, or phosphates and so on. By the addition of further ingredients of this nature a manurial product is obtained which may resemble, although in a more concentrated form, farmyard manure.

I claim:—

1. A peat product for use in horticulture and agriculture consisting principally of dark peat which has been treated with an amount of ammonia which is at least sufficient for neutralizing the free acids in the peat, and an ingredient adapted to prevent production of acidity in the mass during use substantially as set forth.

2. A peat product for use in horticulture and agriculture consisting principally of dark peat containing an amount of ammonia at least sufficient for neutralizing the free acids, and an addition of calcium carbonate substantially as set forth.

3. A peat product for use in horticulture and agriculture consisting principally of dark peat treated with an amount of ammonia at least sufficient for neutralizing the free acids, an addition of calcium carbonate adapted to prevent production of acidity during use, and a small quantity of a mineral body substantially as set forth.

4. Process of manufacturing a peat product for use in horticulture and agriculture consisting in treating peat with ammonia in at least sufficient quantities only for neutralizing the free acids, mixing calcium carbonate with the treated mass substantially as set forth.

5. Process of manufacturing a peat product for use in horticulture and agriculture consisting in mixing with the peat an ammonium salt and a reagent adapted to react with said salt for the production of ammonia, said salt and reagent being in predetermined quantities for producing an amount of ammonia which is at least sufficient for neutralizing the free acids in the peat, substantially as set forth.

6. Process of manufacturing a peat product for use in horticulture and agriculture consisting in mixing with the peat an ammonium salt and a reagent adapted to react with said salt for the production of ammonia, said salt and reagent being in predetermined quantities for producing an amount of ammonia which is at least sufficient for neutralizing the free acids in the peat, and mixing with the peat a suitable quantity of calcium carbonate substantially as and for the purpose set forth.

7. Process of manufacturing a peat product for use in horticulture and agriculture consisting in mixing with the peat ammonia sulfate and an alkaline reagent adapted to react with the ammonia sulfate for the production of ammonia within the mass, said sulfate and reagent being in pre-determined quantities for producing an amount of ammonia which is at least sufficient for neutralizing the free acids in the peat, substantially as set forth.

8. Process of manufacturing a peat product for use in horticulture and agriculture consisting in mixing with the peat ammonia sulfate and an alkaline reagent adapted to react with the ammonia sulfate for the production of ammonia within the mass, said sulfate and reagent being in pre-determined quantities for producing an amount of ammonia which is at least sufficient for neutralizing the free acids in the peat, and mixing with the treated mass a suitable quantity of calcium carbonate substantially as set forth.

JOHN JOSEPH ARTHUR DE WHALLEY.